M. F. PATTON.
TIRE VALVE CAP.
APPLICATION FILED DEC. 10, 1914.
1,162,099.
Patented Nov. 30, 1915.
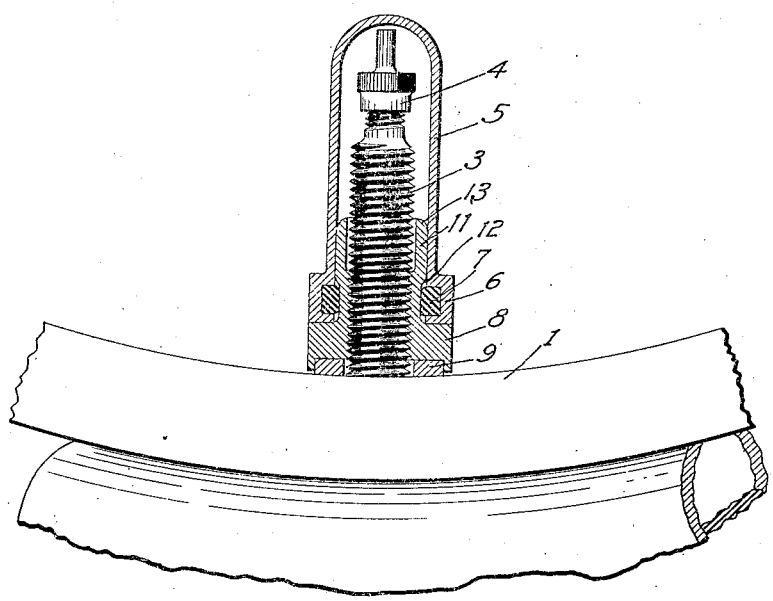
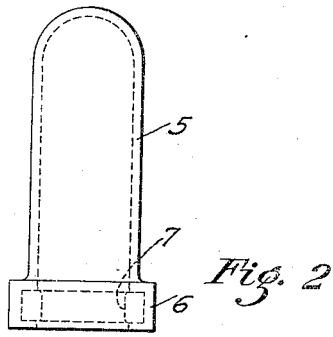
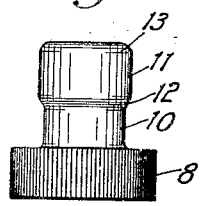
Inventor
Moses F. Patton
Witnesses
By
Attorney

UNITED STATES PATENT OFFICE.

MOSES F. PATTON, OF TUSCALOOSA, ALABAMA.

TIRE-VALVE CAP.

1,162,099.  Specification of Letters Patent.  Patented Nov. 30, 1915.

Application filed December 10, 1914. Serial No. 876,399.

*To all whom it may concern:*

Be it known that I, MOSES F. PATTON, a citizen of the United States, residing at Tuscaloosa, in the county of Tuscaloosa and State of Alabama, have invented certain new and useful Improvements in Tire-Valve Caps, of which the following is a specification.

My invention relates to an improvement in caps for the valves of pneumatic tires and for other like devices, and has for its object to provide a cap which performs all of the functions required of the present type of screw caps and yet is much more quickly and easily detachable for the purposes of permitting the tire to be inflated or deflated or to test the air pressure therein.

The valves of the inner tubes of pneumatic tires, according to the present practice, are passed through a suitable opening in the wheel rim, the stems being threaded throughout their length and adapted to be engaged by an internally threaded cap which requires considerable time and trouble to screw it on and off, which has to be done whenever access is to be had to the valve for any purpose.

According to my invention I subdivide the cap into two members, one being a tubular base member which is suitably held against the wheel rim and which is provided with a tubular shank that has an intermediate reduced portion and is short enough to permit the upper end of the valve stem to project above it and yet is long enough to receive the quick detachable cap member that is preferably held thereon by a friction packing ring which expands into said reduced portion on the extension and holds the cap noiseless in place, perfectly guards against dust, and permits the free approach and removal of the cap.

My invention further comprises the details of construction and arrangements of parts, which are hereinafter more particularly described and claimed, and, which in their preferred embodiment only, are illustrated in the accompanying drawings which form a part of this specification, and in which:—

Figure 1 is a partial view of an automobile wheel showing my improved cap in vertical cross section. Fig. 2 is a detail view of a removable cap member; and Fig. 3 is a detail view of the base member.

Similar reference numerals refer to similar parts throughout the drawings.

I have shown what I regard as the preferred embodiment of my invention applied to an automobile wheel comprising a hub 1, an inner tube 2 having an externally threaded valve stem 3, and a cap 4 on the stem, all of which parts are of standard design. I provide a cap member 5 for protecting the valve stem, which member is provided at its open end with a shoulder 6 which has an internal circumferential channel that receives a compression ring packing 7, which packing is adapted to project slightly above the inner wall of the cap. The base member 8 is internally threaded and adapted to screw down over the valve stem 3 and has its underface chambered to receive a washer 9 and compress it against the wheel rim 1. A tubular cylindrical stud is formed integral with the base member 8 and comprises an intermediate contracted portion 10 and an enlarged head portion 11. A bevel face 12 connects the parts 10 and 11, which latter has its outer end 12 also beveled at 13. The diameter of the head 11 is such as to cause it to fit snugly into the base of the cap 5. The object of this is to require a substantial compression of the packing ring 7 when the cap is forced over the head 11 so that when the packing expands against the reduced portion 10 of the stud, it will hug the latter closely. Preferably the head 11 makes so tight a fit in the cap 5 that an air pack will arise between the packing 7 on one side and the joint between the head and the cap on the other that will assist in resisting the displacement of the cap by sudden jars.

In practice, after the base member 8 has been screwed down on the stem, for which purpose its periphery is knurled, the cap 5 can be mounted by forcing its end over the head 11; in doing which the beveled end 13 of the head compresses the packing 7. When the latter comes opposite the reduced intermediate portion 10, it expands and engages the latter. To test the air pressure or pump up the tire, it is only necessary to grasp the cap 5 firmly and draw it slowly off the stud, which can be done easily and without appreciable trouble or loss of time, and, by reason of the fact that the parts 10 and 11 of the base are joined by a beveled face 12, the packing will ride up the latter without being pulled or torn.

While I have described my invention with particular reference to its application to an automobile tire valve, I do not desire to limit its use to that particular purpose nor do I desire to limit myself to the exact details of construction or the arrangement of parts shown, but to claim such reasonable changes as may be made within the scope of my invention.

Having thus described my invention, what I claim as new and desire to secure by Letters Patent, is:—

1. In a quick detachable mounting for dust caps, in combination, a base member adapted to screw on the valve stem, a reduced tubular extension on said member having an annular intermediate grooved portion, and a cap member having a solid ring packing of compressible material seated firmly in its bore near the open end thereof, which packing projects into said bore and is adapted to be compressed by said entering tubular extension and to expand with a close packing engagement into said grooved portion to detachably hold the cap in engagement with the base member.

2. In a quick detachable mounting for dust caps, in combination, a base member adapted to screw on the valve stem, a tubular extension on said member having an annular intermediate groove, a cap member having an annular groove in its bore near the open end thereof, and a ring packing of compressible material adapted to be received in and to expand into the space of said registering grooves to detachably hold the parts assembled and pack the joint between them, one of the grooves having ring retaining end walls while the other groove has a beveled end wall up which said packing rides as the cap is detached.

3. In a quick detachable mounting for dust caps, in combination, a base member comprising a nut having in its bottom face a washer seat and at the center of its flat top face a reduced tubular cylindrical extension, the outer end of which is enlarged and has its annular end walls beveled, and a top member having at its open end a smooth bore which is adapted to fit tightly over said enlarged end of said extension and which has an annular groove therein with its annular end walls substantially parallel, and an annular compressible packing held seated in said groove and projecting into the bore in said cap and adapted to be compressed into its seat when engaged by either beveled end wall of said enlarged end of said tubular extension, and to resiliently oppose the attachment or detachment of said cap member to or from said base member.

In testimony whereof I affix my signature in presence of two witnesses.

MOSES F. PATTON.

Witnesses:
Wm. H. Orr,
W. W. McIntyre.